United States Patent
Bali et al.

(10) Patent No.: US 8,060,154 B1
(45) Date of Patent: Nov. 15, 2011

(54) CONSERVING POWER ON A MOBILE DEVICE

(75) Inventors: Soshant Bali, Menlo Park, CA (US); Pradeep Kumar Kondamuri, San Mateo, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 422 days.

(21) Appl. No.: 12/412,146

(22) Filed: Mar. 26, 2009

(51) Int. Cl.
*H04B 1/38* (2006.01)

(52) U.S. Cl. ........................................ 455/574; 455/522

(58) Field of Classification Search .................. 455/574, 455/127.5, 522, 558, 502, 343, 343.1, 343.4, 455/69
See application file for complete search history.

(56) References Cited

U.S. PATENT DOCUMENTS

| | | | |
|---|---|---|---|
| 5,363,430 A | 11/1994 | Yamagata | |
| 7,050,798 B2 | 5/2006 | Ranta | |
| 7,155,242 B1 | 12/2006 | MacKenzie | |
| 7,310,535 B1 | 12/2007 | MacKenzie | |
| 7,395,059 B2 | 7/2008 | Ranta | |
| 7,408,887 B2 | 8/2008 | Sengupta | |
| 2007/0207750 A1* | 9/2007 | Brown et al. | 455/127.5 |

* cited by examiner

*Primary Examiner* — Joseph Lauture (57) ABSTRACT

A method, system, and media is presented for conserving power on a mobile device. The method, system, and media include receiving an initial request to communicate data from the mobile device using a radio of the device. This request may be presented while the mobile device is in a power-conservation mode and come from an application running on the mobile device. The method, system, and media may then determine a period of time to wait to grant the initial request so that the mobile device is not immediately transitioned out of the power-conservation mode. This enables the device to conserve power by extending the duration that the mobile device is in the power-conservation mode. The method, system, and media then grants the initial request at an expiration of the period of time.

21 Claims, 7 Drawing Sheets

CONSERVING POWER ON A MOBILE DEVICE

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter.

Many handheld mobile devices come with native or allow users to download third-party applications. These applications can be found on popular websites and provide a user an opportunity to customize their device. For example, Apple Corporation of Cupertino, Calif. and Google Incorporated of Mountain View, Calif. have posted thousands of applications on their application-store websites. A user of an iPhone® mobile device or Android® phone may download any of these applications by simply accessing the website with their mobile device. In fact, it is not uncommon for a user to install tens, if not hundreds, of applications on their device. For example, a user may install an email client application, a social-networking application (e.g., Facebook® social utility), or any other information service application (e.g., latest stock update, sports score update, weather update, etc.) on their mobile device.

A problem with these applications is that they often require background network access to push-pull data from the network. This background network access consumes power and can quickly drain the battery. Especially when there are a number of different applications making a request. To further compound the problem, many devices switch the radio from an active (or "connect", "transmit", etc.) mode to a power-conservation mode whenever the radio becomes inactive for a period of time. Given the random distribution of the connection requests, the result is a constant cycling of the radio from power-conservation mode to a connect mode and then back to a power-conservation mode. This cycling further increases the power consumption of the device. Indeed, it is not uncommon for an application-loaded device to require recharging after only a few hours of use, even if the user did not personally access the device.

Thus, a user of an application-loaded device is left to choose between having to constantly recharge their device or removing installed applications in hopes of reducing background requests. The latter is not a desirable option because most users typically want to make use of all of the applications on their device. Thus, embodiments of the present invention provide systems, methods, and media for conserving power on a mobile device by preventing a granting of an initial radio-usage request until a period of time has elapsed.

In a first illustrative aspect, a method for conserving power on a mobile device is provided. The method includes, in one embodiment, receiving an initial request to communicate data from the mobile device using a radio of the device. This request is presented while the mobile device is in a power-conservation mode and may come from an application running on the mobile device. The method continues with determining a period of time to wait to grant the initial request so that the mobile device is not immediately transitioned out of the power-conservation mode. This is because delaying the request for the period of time conserves power by extending a duration that the mobile device is in the power-conservation mode. The method includes granting the initial request at an expiration of the period of time.

In a second aspect, another method for conserving power on a mobile device is provided. The method includes receiving an initial request to communicate data from the mobile device using the radio. This request is presented while the mobile device is in a power-conservation mode and may come from an application running on the mobile device. The method continues with determining a period of time to wait to grant the initial request. The period of time is determined by setting a confidence level value such that a probability that a subsequent radio-usage request will be received prior to the granting of the initial request is greater than a given percentage. The method further provides deriving a logarithmic result by evaluating a natural logarithm function that includes the confidence level as an input. The method also provides for determining a rate parameter by observing a duration of time between prior requests to use the radio. Given a rate parameter, the method may divide the logarithmic result by the rate parameter to calculate the period of time. The method includes granting the initial request at an expiration of the calculated period of time.

In a third aspect, another method for conserving power on a mobile device is provided. The method includes receiving an initial request to communicate data from the mobile device using the radio. The method first determines if the mobile device is in a power-conservation mode. If the device is in a power-conservation mode, then the method continues by determining a duration of time to wait to grant the initial request. This duration of time includes determining a first period of time by evaluating a Poisson distribution function that includes a confidence level and a rate parameter as an input. It also includes determining a second period of time by evaluating a battery charge function that includes a remaining charge in a battery of the mobile device as an input. The first period of time is compared to the second period of time and the period of time having a lower value is selected as the duration of time. The method may grant the initial request once the duration of time elapses.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| CDMA | Code Division Multiple Access |
| FDMA | Frequency Division Multiple Access |
| GPRS | General Packet Radio Service |
| GSM | Global System for Mobile Communications |
| IEEE | Institute of Electrical and Electronic Engineers |
| I/O | Input/Output |
| OFDMA | Orthoginal Frequency Division Multiple Access |
| SS7 | Signaling System 7 |
| TDMA | Time Division Multiple Access |
| WiMAX | World-Wide Interoperability for Microwave Access |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
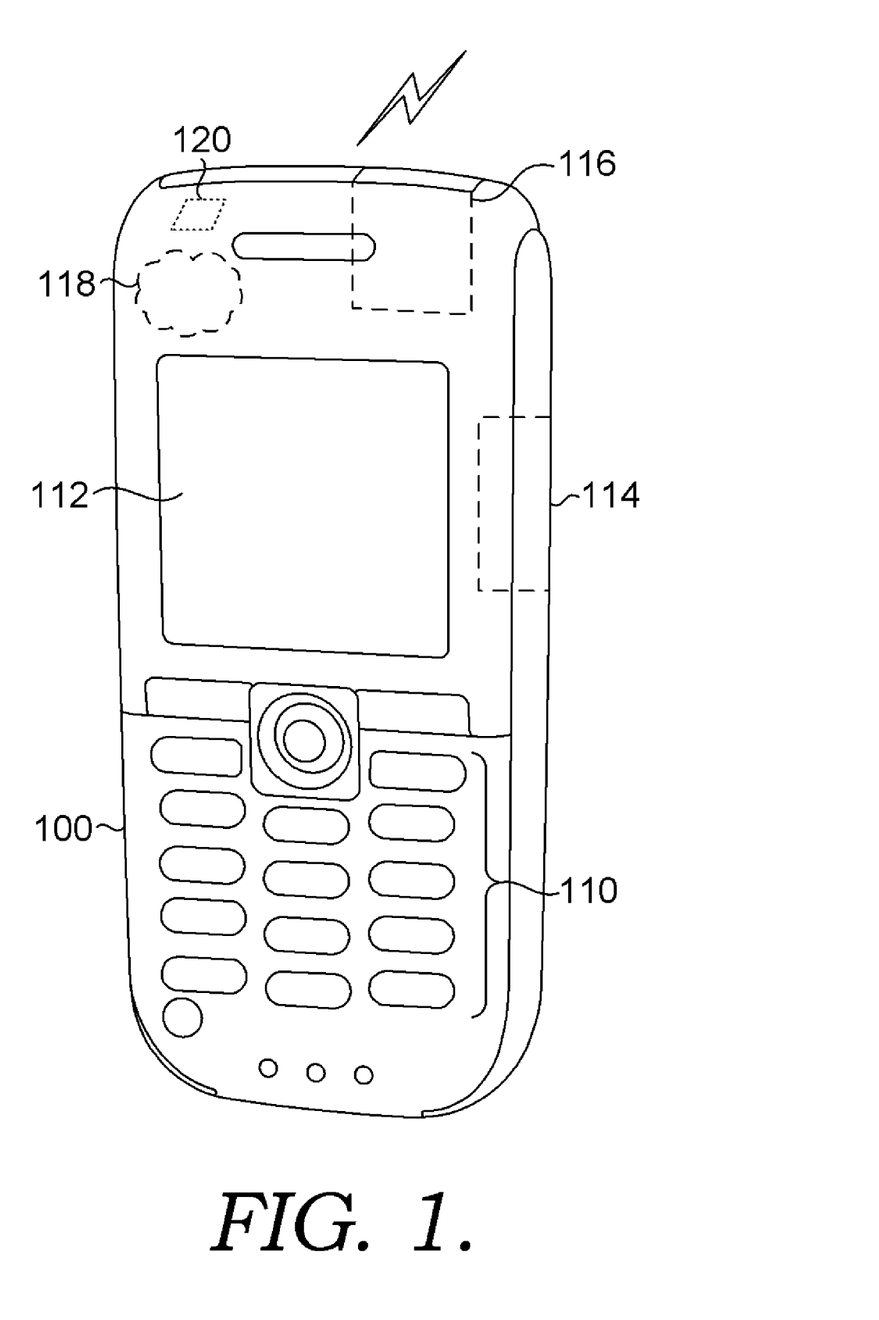
FIG. 1, depicts an illustrative mobile communications device suitable for practicing an embodiment of the present invention.

Turning now to FIG. 1, an illustrative mobile communications device is provided and referenced generally by the numeral 100. For brevity or as a shorthand form, this description might refer to a "mobile device" or even just "device" instead of a "mobile communications device." This shorthand does not mean to imply a distinction with the different terms. Mobile communications device 100 includes a keypad 110 as well as a display 112, which is suitable for presenting a user interface. As discussed in more detail below, display 112 provides an input/output (I/O) interface that a user may engage to interact with device 100. For example, display 112 may include a touch screen that a user may scratch or touch to interact with device 100.

In addition, device 100 includes a battery 114 and a radio 116. Battery 114 provides a source of power for mobile device 100. Battery 114 may be a rechargeable battery and its power dissipation may be proportional to the number of times an application or device is engaged or operates on mobile device 100. For example, radio 116 is one component that reduces the remaining charge in the battery each time it is engaged. This is because radio 116 enables device 100 to communicate with other devices via a wireless technology. This wireless technology may include, but is not limited to, Time Division Multiple Access (TDMA), Frequency Division Multiple Access (FDMA), Orthogonal Frequency Division Multiple Access (OFDMA), Code Division Multiple Access (CDMA), GSM (Global System for Mobile Communications), GPRS (General Packet Radio Service), or WiMAX (World-Wide Interoperability for Microwave Access) technology.

Device 100 may also include control software 118 and memory 120. Control software 118 carries out various functional aspects and might take on a variety of forms. For example, the control software might include configuration settings, might facilitate communicating data between multiple devices, might handle updates, include user settings, etc. Specifically, control software 118 may be used to implement a method for conserving power on mobile device 100 by delaying a radio-usage request until a period of time has elapsed. Likewise, control software 118 may include a calculation module for determining a period of time to delay the radio-usage request. Memory 120 may include a data structure that stores control software 118 and facilities the operation of control software 118. For example, memory 120 may include a look-up table or graphical function that may be used for determining the period of time to delay the radio-usage request.

Figure 2:
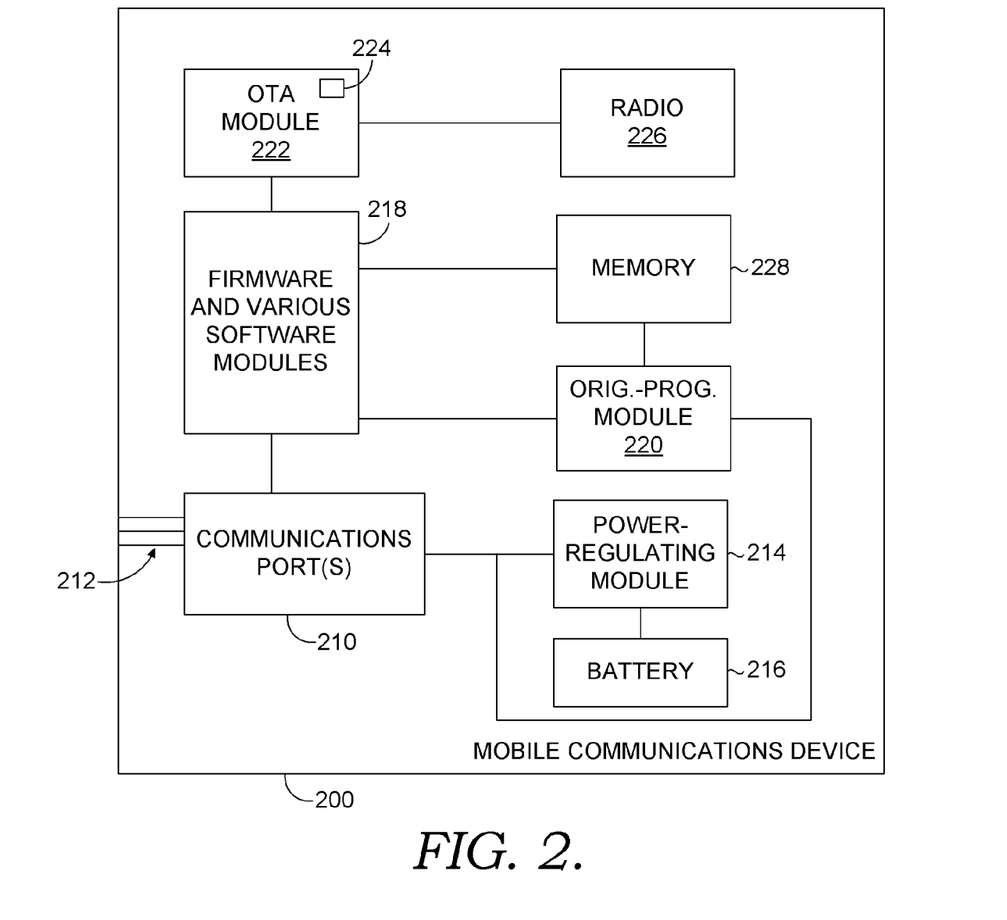
FIG. 2, depicts an illustrative schematic representation of the mobile communications device of FIG. 1 according to an embodiment of the present invention.

Turning now to FIG. 2, a schematic diagram of an illustrative mobile communications device (which could include mobile device 100) is provided and referenced generally by the numeral 200. Mobile communications device 200 includes a set of communications ports 210, each of which might include a set of leads 212. Because readability can sometimes be frustrated by trying to refer to too many items in the plural, certain items will be referenced in the singular. Although reference is made to certain items in the singular, it by no means implies that there is only one such item. For example, a reference to a radio of the mobile communications device, does not mean to imply that it has only a single radio. To the contrary, the mobile device might have multiple radios to facilitate, among other things, communications with various types of networks such as CDMA, WiMAX, and GSM to name a few.

Communications port 210 is coupled to a power-regulating module 214. Power-regulating module 214 is coupled to a power source or battery 216, and regulates power to, and sometimes from, battery 216 of the mobile device. Thus, leads 212 might enable communications port 210 to receive a flow of electricity that is received by power-regulating module 214, which directs the flow to battery 216. Power-regulating module 214 may also be used to prevent power from being sent to other modules or components of device 200. For example, power regulatory module 214 may limit the power sent to a radio of device 200.

In some embodiments, communications port 210 is coupled to an original programming module 220 (if included, and variously referred to herein as an "over-the-wire" module). Note, just because we mention "if included" in connection with some components does not intimate that other components are required. This module, as with many other modules described herein, might be known by different names to those of ordinary skill in the art. For example, some might know original-programming module 220 by the terms "factory-programming module," or "over-the-wire (OTW) module." Regardless, the functionality offered by original programming module 220 is to help facilitate an original-programming of mobile communications device 200. That is, in a factory-type setting, original instructions might be provided to firmware and various other software modules, which is referenced by numeral 218. Specifically, embodiments of the present invention for conserving power may be stored in device 200 as part of the original firmware or as part of a software module 218.

In contrast to over-the-wire module 220, an over-the-air (OTA) module 222 receives data over the air; that is, by way of a wireless telecommunications network. In some embodiments, it is associated with an identifier 224. A wireless telecommunications network is a network capable of communicating data in a wireless-telecommunications context. Thus, networks such as Wi-Fi networks or small short-range networks such as Bluetooth networks are distinguished from wireless telecommunications networks. Although those networks might form a portion of a wireless telecommunications network, they are not synonymous with a wireless telecommunications network.

OTA module 222 (in included) receives data that is wirelessly communicated from a telecommunications network. In one embodiment, the data is received by way of a radio 226, which sends and receives wireless signals to and from a wireless telecommunications network. As discussed above, radio 226 might communicate data in formats such as CDMA, GSM, or WiMAX. Again, embodiments of the present invention control the denying and granting of a radio-usage request to communicate data from mobile device 200. This request may be for either wireless telecommunications network requests or small short-range network requests.

Firmware and other various software modules 218 include various types of software modules or other firmware that might be present in mobile communications device 200. As discussed above, illustrative software includes things such as the operating system of a phone, third-party applications such as games, programs to watch television on the device, ring tones, location-based services, contact information, and the like. Likewise, software and firmware modules 218 may be stored in memory 228. In addition, software applications may use a number of different protocols such as Transmission Control Protocol (TCP) or User Datagram Protocol (UDP) to transmit data via radio 226.

FIG. 2 is not meant to indicate all, or even major, systems or components of mobile communications device 100. Similarly, the connections shown are not meant to indicate that other connections are not present or that the connections are direct connections. An overview of mobile communications device 100 is presented and certain components are listed so as to be able to refer to them throughout this disclosure. In sum, embodiments of the present invention may conserve the power remaining in battery 216 by regulating an application's ability to engage communication ports 210 and radio 226.

Figure 3:
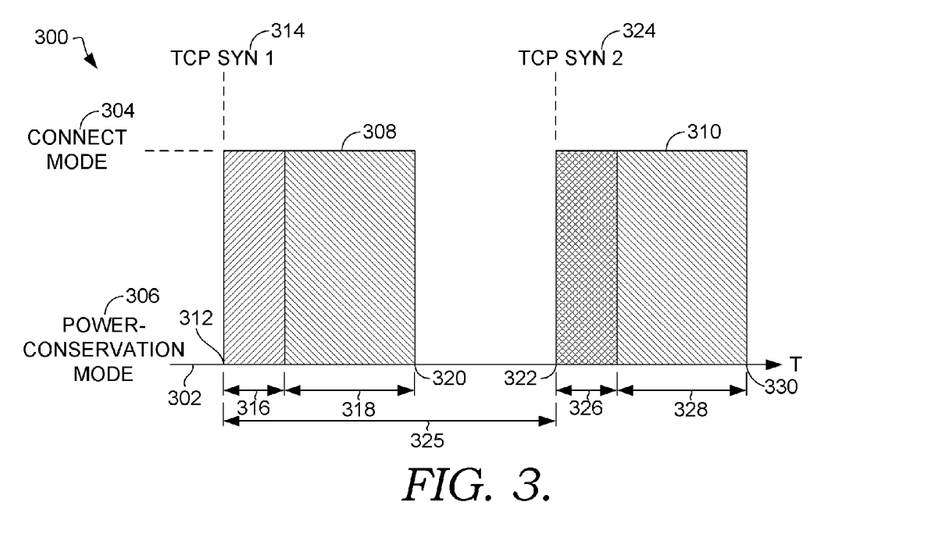
FIG. 3, depicts a mobile device transitioning from a power-conservation mode to a connect mode when an embodiment of the present invention is not implemented.

FIG. 3 illustrates an example of transitioning a mobile device from a power-conservation mode to a connect mode when an embodiment of the present invention is not implemented. Specifically, FIG. 3 illustrates timeline 300 having an x-axis 302 representing time and a y-axis representing radio status (i.e., connected mode 304 or power-conservation mode 306). In general, the difference between connected mode 304 and power-conservation mode 306 is as follows. In the connected mode, radio 226 can transmit and receive data. This results in higher power consumption because radio 226 requires power to transmit and receive data. Thus, the power consumption of battery 216 can ramp up quickly given that a user may have several applications on device 200 submitting radio-usage requests. In addition, radio 226 may also draw power even when device 200 is not transmitting or receiving application data. This is because radio 226 is also used to transmit control data.

Thus, to conserve battery power, device 200 may include a power-conservation mode. A power-conservation mode is a mode where the radio is turned off or placed in a mode so as not to draw as much power as it does when it is in connect mode. This power-conservation mode may include a standby mode or a non-radio-using mode. FIG. 3 illustrates two cycles of transitioning from a power-conservation mode 306 to a connect mode 304 and back to a power conservation mode 306. These two cycles are generally represented by numerals 308 and 310, and represent two separate requests by an application to communicate data from device 200 using radio 226.

Specifically, at a time 312 device 200 receives a request to transmit data using radio 226. This request starts with a request to open a TCP connection or "TCP SYN 1" 314 in the application layer code. Upon receiving request 314, radio 226 is switched from power-conservation mode to connect mode and the data is transmitted for a period of time 316. After the data packets have been transferred, radio 226 remains in connect mode 304 for a period of time 318. This may be referred to as an inactivity mode and "leaves the door open" for other applications to access the radio 226 before it is switched back to power-conservation mode 306. The inactivity mode attempts to minimize power consumption resulting from cycling the radio on-off. Cycling the radio on-off can consume more power than simply leaving the radio on in certain situations. Once the inactivity period of time 318 expires, the radio is transitioned back to power-conservation mode 306 at a time 320.

FIG. 3 further shows a second request by an application installed on device 200 to communicate data from the device using radio 226. Specifically, at a time 322 device 200 receives a request to transmit data using radio 226. Again this request starts with a request to open a TCP connection and is labeled "TCP SYN 2" 324. This request is received some period of time 325 after the initiation of cycle 308 which started at time 312. Period of time 325 may be referred to as the inter-arrival or the duration of time between requests. Upon receiving request 324, radio 226 is switched from power-conservation mode 306 to connect mode 304 and the data is transmitted for a period of time 326. After the data packets have been transferred, radio 226 remains in connect mode 304 for a period of time 328. Again, this may be referred to as an inactivity mode and provides a period of time for other applications to access the radio 226 before it is switched back to power-conservation mode 306. Once the inactivity period of time 328 expires, the radio is transitioned back to power-conservation mode 306 at a time 330.

To provide illustrative figures in connection with FIG. 3, assume that period of time 316 and 326 are about 2 seconds. We speak of "2 seconds" here and other amounts of time below (immediately and further) merely to help explain an embodiment of the invention. These numbers are not meant to be limiting or restrictive. Further, assume that period of time 318 and 328 are about 10 seconds and the period of time 325 or inter-arrival time is about 20 seconds. Given these numbers, the total period of time that the radio is in connect mode is about 24 seconds for these two requests. Embodiments of the present invention provide a way to minimize the number of times radio 226 is turned on and off, as well as, the length of time radio 226 is in connect mode 304.

Figure 4:
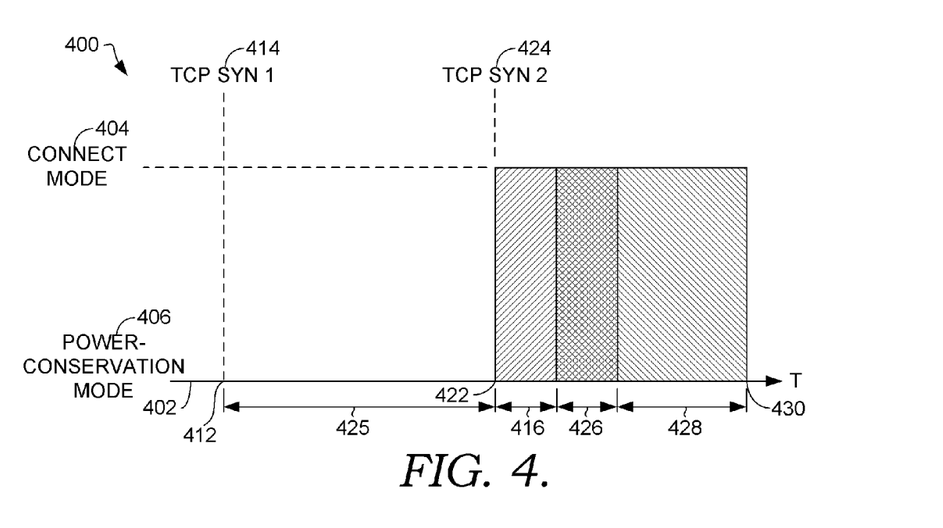
FIG. 4, depicts a mobile device transitioning from a power-conservation mode to a connect mode when an embodiment of the present invention is implemented.

FIG. 4 illustrates an example of transitioning a mobile device from a power-conservation mode to a connect mode when an embodiment of the present invention is implemented. Specifically, FIG. 4 illustrates timeline 400 having an x-axis 402 representing time and a y-axis representing radio status (i.e., connected mode 404 or power-conservation mode 406). Like before, the figure is representative of device 200 receiving two requests to use radio 226 to transmit data. The major difference, however, is that embodiments of the present invention do not immediately switch device 200 to connect mode upon receiving an initial request. Instead, the initial request is denied for a period of time. The determination of this period of time will be discussed in more detail below. For now, it is enough to understand that embodiments of the present invention attempt to conserve power by delaying radio-usage requests until there is a probability that more than one radio-usage request is waiting in the queue.

Specifically, at a time 412 device 200 receives a request to transmit data using radio 226. This request is identified as "TCP SYN 1" 414. Instead of granting this request, embodiments of the present invention delay request 414 for a period of time 425. Again, how this period of time is determined will be discussed in more detail below. After period of time 425 has expired, radio 226 is switched from power-conservation mode to connect mode and the data is transmitted for a period of time 416. The reason that the initial request was denied was because during period of time 425, a second request, labeled "TCP SYN 2" 424 was received at a time 422. Thus, not only are the data packets transmitted for request 414, but they are also transmitted for request 424. Specifically, data packets for request 414 are transmitted during a period of time 416 and data packets for request 424 are transmitted during a period of time 426 which occurs directly after the transmission of the first data packets. As before, radio 226 remains in connect mode 404 for a period of time 428 after the data packets have been transmitted. Once the inactivity period of time 428 expires, the radio is transitioned back to power-conservation mode 406 at a time 430.

Providing illustrative figures in connection with FIG. 4, assume that period of time 416 and 426 are about 2 seconds. Further, assume that period of time 428 is about 10 seconds. These are the same number used for FIG. 3, where period of time 316 and 326 were about 2 seconds and period of time 328 was about 10 seconds. Given these numbers, the total period of time that the radio is in connect mode in FIG. 4 is about 14 seconds for these two requests. This is 10 seconds less than the radio was in connect mode in FIG. 3, which had a total period of time of 24 seconds. In addition, a complete on-off cycle was eliminated by the method represented in FIG. 4. Thus, not only was power saved by reducing the amount of time the radio was in connect mode, but power was also saved by avoiding second cycle 310. Moreover, this power savings was obtained without having to reduce the period of time the data was transferred.

Figure 5:
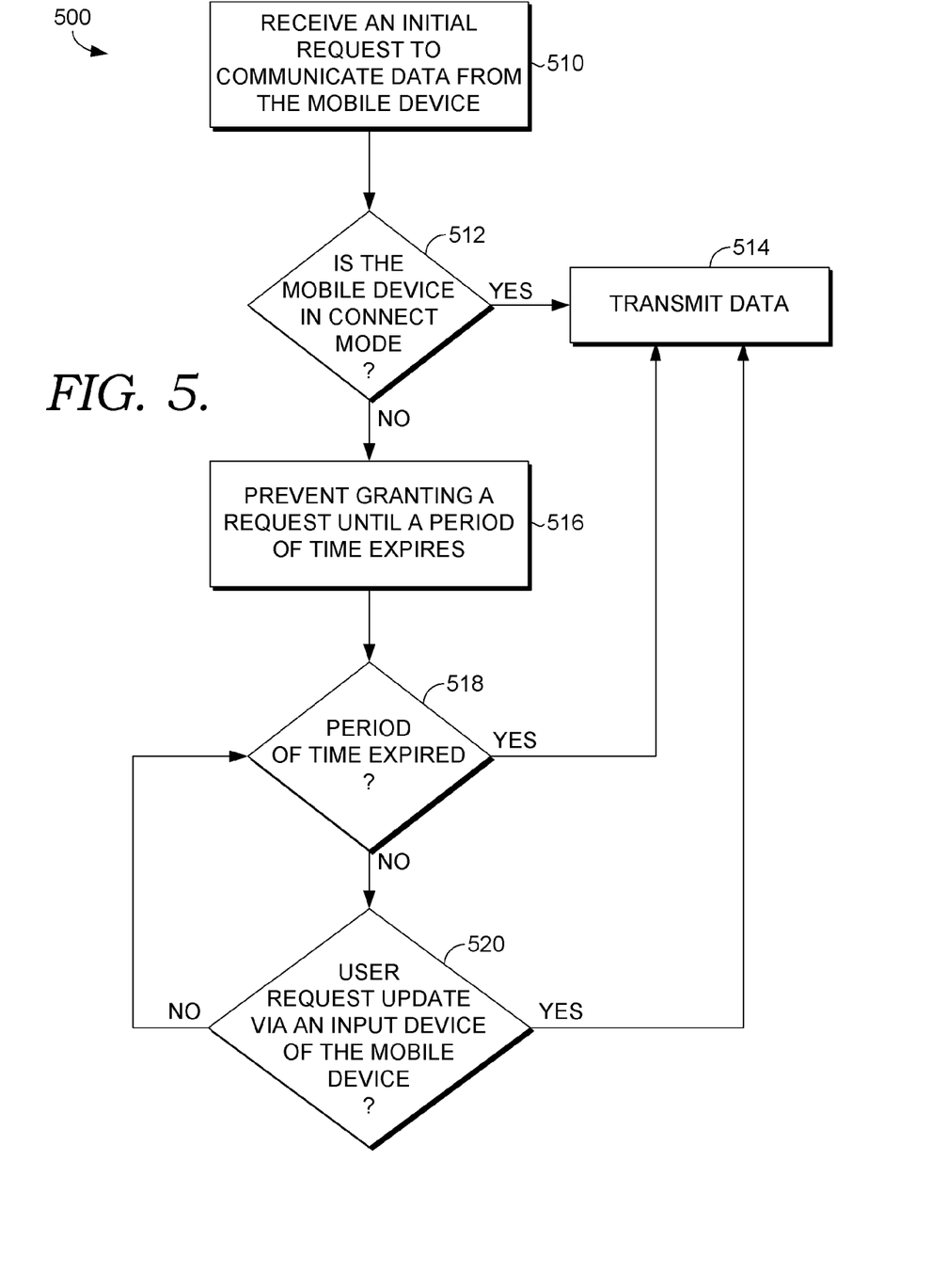
FIGS. 5-6, depict illustrative methods for enabling a wireless mobile-communications device to conserve power.

Turning now to FIG. 5, an illustrative method for practicing an embodiment for the present invention is provided generally by the numeral 500. As discussed, current mobile devices allow users to download and run third-party applications. These applications may include email and social networking applications that are programmed to continually check for updates. Thus, at a step 510, an application 218 running on mobile 200 makes a request to communicate data from the mobile device using radio 226. This may be a single TCP SYN 1 414 request from a single application or it may be multiple requests from multiple applications. For example, the request may be from an application running in the background that periodically checks stock prices, weather updates, sport scores, etc.

After receiving an initial request, at a step 512, it is determined if device 200 is in connect mode 404 or power-conservation mode 406. If mobile device 200 is in connect mode, the data is transmitted at a step 514 via radio 226. If mobile device 200 is not in connect mode 404, then granting of the request to transmit data is denied at a step 516. This request is denied until a period of time elapses at a step 518. This period of time may be determined in a number of different ways. First, it may be a predetermined value set by a user or manufacturer based on a number of different factors. For example, in some embodiments this value might include a relatively high value such as 10 minutes. This may be beneficial if the user has a number of applications installed on device 200 whose frequent update requests may drain battery 216 if every update request was instantly granted. This is especially true if the background applications are delay insensitive and the user does not require more frequent updates.

In other embodiments of the present invention, the predetermined value may be much smaller and even a few seconds. This might be applicable where the background application is delay sensitive and the user might value information over power conservation. In still further embodiments of the present invention, each application may have unique predetermined delay values. For instance, a background application that checks weather updates may be delayed longer than a background application that checks for stock updates.

A second possible way of determining the period of time is to calculate a period of time based on radio-usage history on the device. Examples of ways to calculate this value will be discussed with regard to FIG. 6. A third possible way of determining the period of time is to consider the amount of charge remaining in battery 216. Examples of ways to determine a period of time based on the remaining charge in the battery will be discussed with regard to FIG. 7.

Referring back to FIG. 5, once the period of time has expired, then the request to transmit data via radio 226 is granted. At this point, radio 226 would be switched from power-conservation mode 406 to connect mode 404 to transfer the data packets. In addition, even if the period of time has not elapsed, radio 226 may still switch to connect mode if a user requests an update via an I/O device at step 520 coupled to or integrated into device 200. For example, a user may request the score of a sporting event or the latest stock price by keying it in with keypad 110 or touching the touch screen 112. Again, in this scenario, radio 226 may be switched from power-conservation mode to connect mode even if the period of time has not expired.

Figure 6:
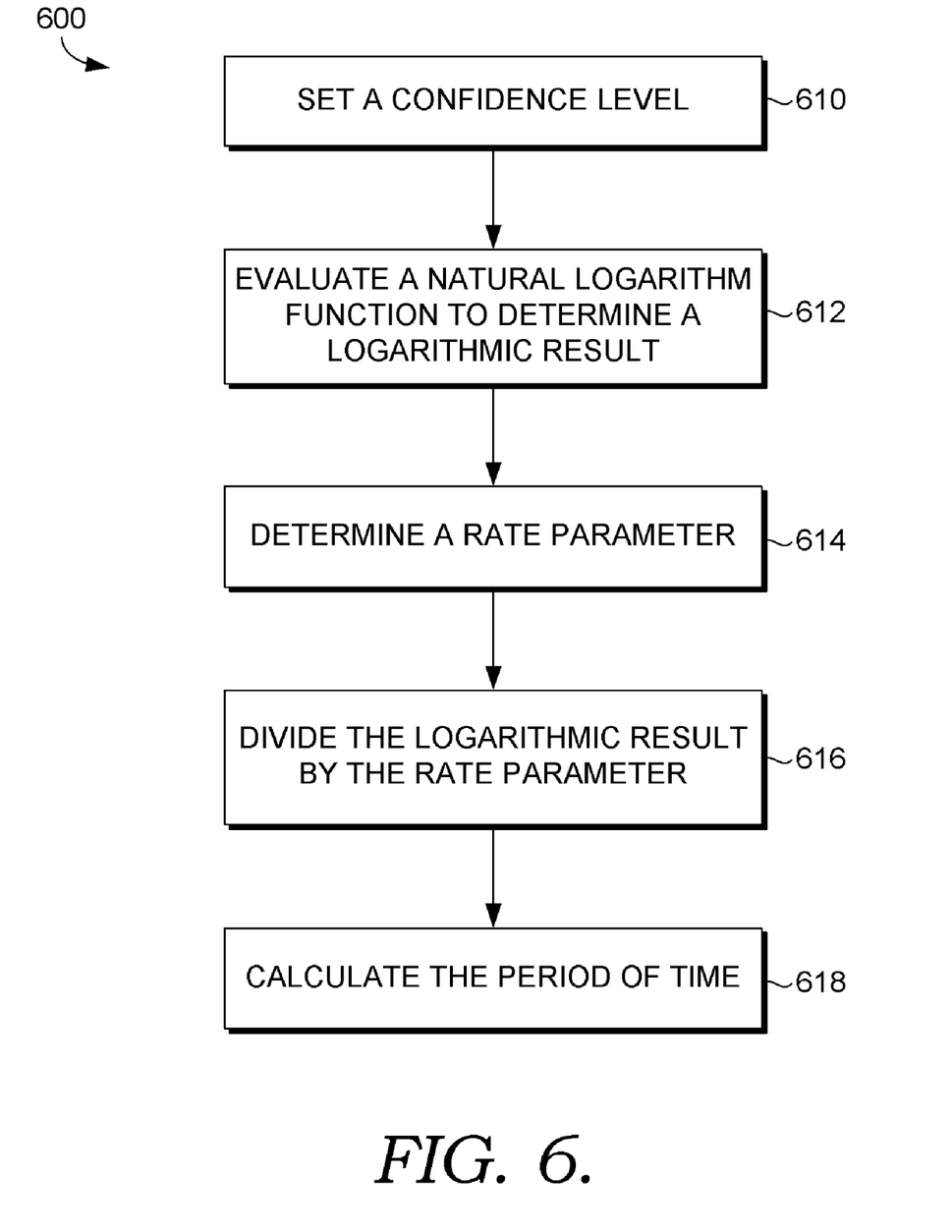

Turning now to FIG. 6, an illustrative method for calculating a period of time for delaying a transmission request is provided generally by the numeral 600. This method automatically calculates the delay time by assuming that inter-arrival time of TCP SYN request is an exponentially distributed random variable. As discussed above, a beneficial delay time is one that ensures more than one request is in the queue before switching the radio out of power-conservation mode as illustrated in FIG. 4. Thus, given the exponential distribution assumption, the TCP SYN arrivals can be modeled as a Poisson process. When arrivals are modeled as a Poisson process, the probability of "n" arrivals in time period tau (τ) seconds is represented by Equation 1.

$$\theta_n = 1 - \sum_{k=0}^{n-1} \frac{(\tilde{\lambda}\tau)^k e^{-\tilde{\lambda}\tau}}{k!}$$

Equation 1

The variables in this equation include theta ($\theta_n$), lambda ($\tilde{\lambda}$) and tau (τ). Theta is referred to as the confidence level and indicates a probability that "n" number of events will occur within a given time, tau. For example theta equal 0.95 would indicate a 95% probability that "n" number of events will occur within a given time period. The confidence level is also a function of lambda, the rate parameter, which indicates the estimated number of events expected to occur per second. For example, if the inter-arrival time 325 is 10 seconds, then lambda is one divided by ten or 0.1. One skilled in the art would recognize this distribution and could use numerical methods to iteratively solve this equation when n is greater than 1.

In addition, when n is equal to one, Equation 1 can be reduced to a closed form expression that is represented by Equation 2.

$$\theta_1 = 1 - e^{-\tilde{\lambda}\tau}$$ Equation 2

Equation 2 can be solved for tau to arrive at Equation 3.

$$\tau = \frac{-\log_e(1-\theta_1)}{\tilde{\lambda}}$$ Equation 3

Equation 3 can be used to determine the period of time that an initial request should be delayed so that the probability that at least one other TCP SYN request arrives in this time period is equal or greater than a percentage, theta. For example, if the estimated inter-arrival time of TCP SYN packets is 10 seconds (meaning lambda is 0.1 or 1 divided by 10) and theta is 0.95, Equation 3 predicts that the TCP SYN should be delayed for about 29 seconds. A method for performing this delay-determination process is illustrated by FIG. 6.

Referring to FIG. 6, at a step 610, a confidence level may be set to a value such that the probability of a subsequent radio-usage request occurring prior to the granting of the first request is greater than a given percentage. Thus, embodiments of the present invention provide an opportunity to set the value of the confidence level based on the desired probability of subsequent events occurring. A value of 0.95 is used in some embodiments of the present invention. One skilled in the art will realize that the delay time increases as the confidence level increases. Therefore, if a shorter period of time is desired, then theta might be decreased to 0.90. The drawback is that now there is only a 90% probability, versus 95% probability, that there will be at least one other request waiting in the queue when the calculated period of time lapses. In sum, step 610 provides for the opportunity of setting the confidence level At a step 612, a natural logarithm function may be evaluated to determine a logarithmic result consistent with the assumed exponential distribution. In one embodiment of the present invention, the numerator of Equation 3 may be evaluated to determine a logarithmic result, given the confidence level set in step 610. It should be noted that embodiments of the present invention are not limited to an exponential distribution and other distributions may be implemented to model the occurrence of events.

At a step 614, the method 600 determines a rate parameter. As discussed above, the rate parameter represents the estimated number of events expected to occur per second. Thus, one way to determine the rate parameter is to observe the number of TCP SYN that occurred during a prior window of time and calculate the inverse of that number. This prior window of time may include observing the inter-arrival times 325 for a few minutes, hours, or days. Moreover, embodiments of the present invention provide performing step 614 on a continual basis to update the rate parameter based on the duration of time between prior requests to use the radio. Because users tend to add more and more applications to their hardware over time, updating the rate parameter provides a recent snapshot of the rate at which these applications are making requests.

At a step 616, the logarithmic result obtained in step 612 is divided by the rate parameter determined at step 614. One example of this is illustrated by Equation 3. Thus, at a step 618, the delay-determination process calculates the period of time to wait to grant the request to use the radio when the radio is in sleep mode. As discussed above, this delay-determination process is just one way to determine a period of time that the request should be delayed so that mobile device 200 is not immediately transitioned out of the power-conservation mode.

Figure 7:
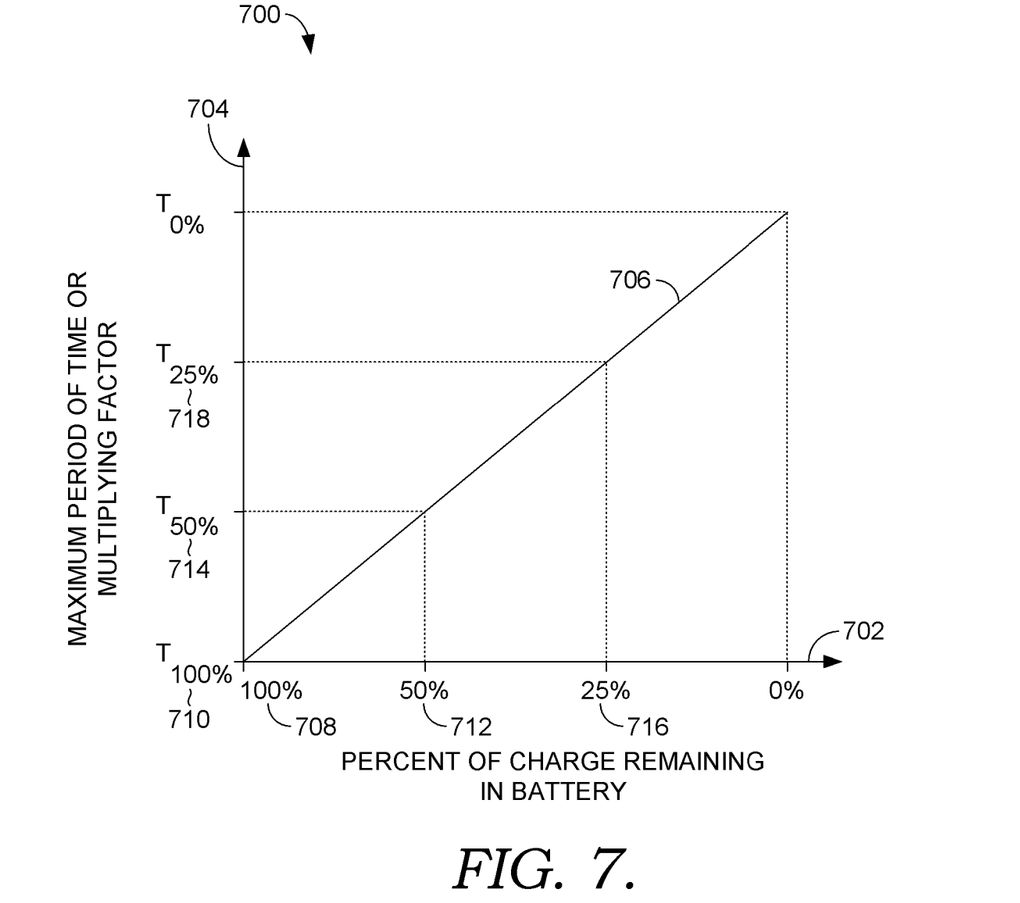
FIG. 7, is a graphical representation for determining a maximum period of time based on an amount of charge remaining in a battery.

Turning now to FIG. 7, graph 700 provides one example of a way to determine a second period of time that may be used by device 200 to delay a transmission request. Specifically, graph 700 includes an x-axis 702 that represents the percentage of charge remaining in the battery and a y-axis 704 that represents a corresponding maximum period of time or a multiplying factor that can be applied to a predetermined value. For the purpose of the discussion regarding graph 700, the maximum period of time and multiplying factor may be used interchangeably even though they may be applied differently. For one embodiment of the present invention, graph 700 illustrates a liner relationship 706 between the maximum period of time and the percentage of charge remaining in the battery. That is, as the charge in the battery decreases, the maximum period of time increases. In other words, the updates to the background applications become further delayed as the battery loses power. This reserves power resources for other functions of mobile device 200 such as receiving a call or text message.

Specifically, if battery 216 is at 100% 708 or is fully charged then the maximum period of time would be at its minimum value 710. Likewise, if battery 226 is at 50% of full charge 712 then the maximum period of time would increase to 714 which is greater than 710. Similarly, if battery 226 is at 25% of full charge 716 then the maximum period of time would increase to 718 which is greater than 710 and 714. One skilled in art would recognize that the period of time determined from FIG. 7 could be in the form of an equation or a look-up table contained in memory 228 of device 200.

To provide exemplary numbers of such a calculation, assume that the maximum period of time for a fully charged battery is 1 minute. That is, for a fully charged battery 708, the maximum period of time 710 is 1 minute. This maximum period of time may increase linearly so that at 50% full charge the corresponding maximum period of time 714 is 3 minutes and at 25% full charge the corresponding maximum period of time 718 is 4 minutes. In other words, the maximum period of time increases by 1 minute for every 25% reduction in the charge of the battery. Likewise, y-axis 704 can represent a multiplier that may be used to calculate the maximum period of time by multiplying the maximum period of time for a fully charged battery by this number. For example, the multiplier 714 may be 3 for 50% remaining charge in the battery and the multiplier 718 may be 4 for 25% remaining charge in the battery. Thus, if a fully charged battery's maximum period of time 710 is 1 minute, the calculated maximum period of time would increase to 3 minutes for 50% remaining charge and 4 minutes for 25% remaining charge. Again, these are only exemplary numbers used to illustrate concepts related to FIG. 7 and these examples do not limit embodiments of the invention in any way.

Finally, embodiments of the present invention may include a decreasing liner relationship or the inverse of relationship 706 illustrated in graph 700. In other words, as the charge in the battery decreases the maximum period of time would also decrease. This would mean that as device 200 begins to lose power the period of time that the request would be delayed would decrease. In addition, embodiments of the present invention may include a nonlinear relationship. For example, the maximum period of time may exponentially increase or decrease as the percentage of charge remaining in the battery increases or decreases.

Figure 8:
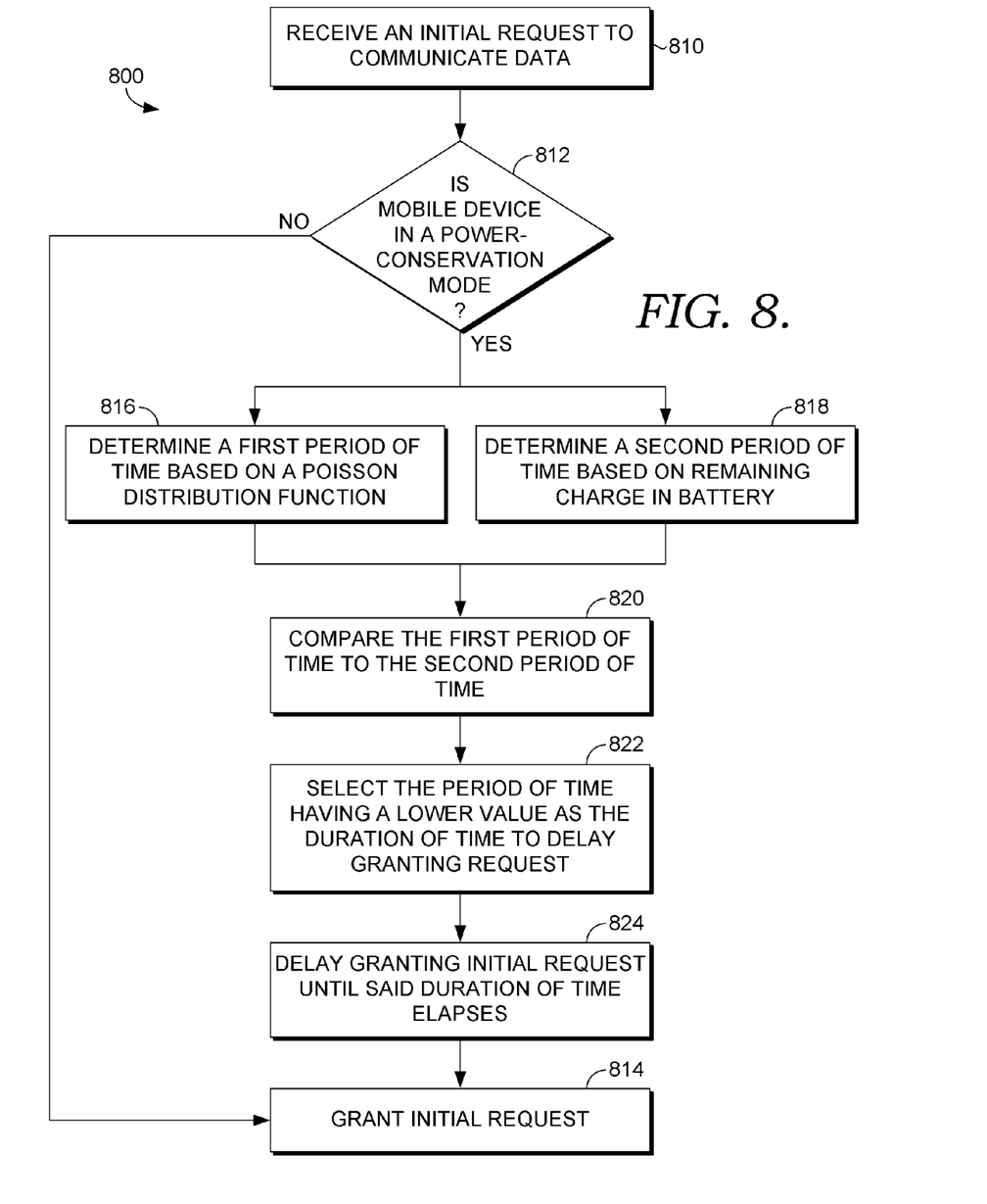
FIG. 8, depicts an illustrative method for enabling a wireless mobile-communications device to conserve power.

Turning now to FIG. 8, an illustrative method for practicing an embodiment for the present invention is provided generally by the numeral 800. As discussed above, embodiments of the present invention contemplate at least three different ways of determining a period of time to delay radio-usage requests. The method illustrated in FIG. 8 provides one way these different periods of time may be implemented to determine a duration of time for denying a radio-usage request. At a step 810, an application 218 running on mobile 200 makes a request to communicate data from the mobile device using radio 226. As discussed, the request may be from an application running in the background that is programmed to periodically check for updates.

Upon receipt of the initial request, a determination is made as to whether device 200 is in power-conservation mode 406 or connect mode 404. As before, if mobile device 200 is in connect mode, then the data is transmitted at a step 814 via radio 226. If mobile device 200 is not in connect mode 404, then granting of the request to transmit is denied until a duration of time elapses. This duration of time may be selected by comparing other predetermined periods of time or other calculated periods of time to select the most appropriate one. For example, at a step 816, a first period of time may be determined by evaluating a Poisson distribution function that includes a confidence level and a rate parameter as an input. This is illustrated by Equation 1 discussed above. Likewise, at a step 818, a second period of time may be determined by evaluating a battery charge function that includes considering a remaining charge in a battery of the mobile device. An example of this was discussed with regard to FIG. 7.

At a step 820 and 822, the two periods of time determined in step 816 and 818 are compared and one is selected as the duration of time to denya radio-usage request. In this example, the period of time having a lower value is selected as the duration of time. One skilled in the art would appreciate that both of the periods calculated in steps 816 and 818 may change over time. For example, the period of time calculated in step 816 may change as more applications are downloaded to device 200. Likewise, the period of time determined in step 818 may change as the battery loses its charge. Thus, step 820 and 822 capture the dynamic relationship of the various methods for calculating periods of time. Specifically, in this example, the lower period of time is selected because it provides a balanced trade-off between application demand and battery life.

In other embodiments, a more conservative approach may be used and the period of time having the higher value may be selected. In addition, more than just two periods of time may be compared. For example, a predetermined or static value may also be used to determine the duration of time. For example, in some embodiments this value might include a relatively high value such as 10 minutes. As discussed, this may be beneficial if the user has a number of applications installed on device 200 whose frequent updates may drain battery 216. At a step 824, the request is delayed for the duration of time selected at step 822. When this duration of time elapses then the initial request is granted at a step 814.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Computer-readable media having computer-useable instructions embodied thereon that, when executed, enable a mobile device that includes a radio to perform a method of conserving power, the method comprising:
   while the mobile device is in a power-conservation mode, receiving from an application running on the mobile device an initial request to communicate data from the mobile device using the radio;
   determining a period of time to wait to grant the initial request so that the mobile device is not immediately transitioned out of the power-conservation mode,
      (1) wherein transitioning out of the power-conservation mode is necessary to communicate the data;
      (2) wherein waiting the period of time will conserve the power by extending a duration that the mobile device is in the power-conservation mode; and
      (3) wherein the period of time is calculated using an algorithm that takes radio-usage history on the device as an input and assumes that an inter-arrival time between requests is a variable with random distribution;
   preventing a granting of the initial request until the period of time elapses; and
   granting the initial request at an expiration of the period of time.

2. The media of claim 1, wherein determining the period of time includes performing a delay-determination process comprising:
   providing an opportunity to set a value of a confidence level, which will indicate a probability that a subsequent radio-usage request will be received prior to the granting of the initial request;
   setting the confidence level to a value such that the probability is greater than a given percentage;
   deriving a result by evaluating a natural logarithm function that includes the confidence level as an input, thereby producing a logarithmic result;
   determining a rate parameter, which will indicate an expected number of radio-usage requests per second, and wherein the rate parameter is a function of a duration of time between prior requests to use the radio; and
   dividing the logarithmic result by the rate parameter to calculate the period of time.

3. The media of claim 2, further comprising setting the confidence level at about 95 percent.

4. The media of claim 2, further comprising continually updating the rate parameter based on the duration of time between prior requests to use the radio.

5. The media of claim 4, wherein continually updating the rate parameter includes reviewing the duration of time between a set of radio-usage requests that were received during a prior window of time, which is defined by one or more of a prior set of minutes, hours, or days.

6. The media of claim 2, wherein deriving the logarithmic result includes evaluating the natural logarithm function of one minus the confidence level.

7. The media of claim 1, wherein determining the period of time includes using numerical methods to iteratively solve a Poisson process.

8. The media of claim 1, wherein determining the period of time includes setting the period of time at about 10 minutes.

9. The media of claim 1, further comprising granting the request if the period of time exceeds a maximum period of time, and the maximum period of time has expired even if the period of time has not expired.

10. The media of claim 9, wherein the maximum period of time is a determined by considering an amount of charge remaining in a battery of the mobile device.

11. The media of claim 10, wherein the maximum period of time is determined by multiplying a predetermined period of time corresponding to a fully charged battery by a multiplier, wherein the multiplier is selected based on the amount of charge remaining in the battery.

12. The media of claim 1, further comprising establishing a transmission control protocol connection to communicate the data.

13. The media of claim 1, wherein the power-conservation mode includes one or more of:
a standby mode, and
a non-radio-using mode.

14. Computer-readable media having computer-useable instructions embodied thereon that, when executed, enable a device that includes a radio to perform a method of conserving power, the method comprising:
while the device is in a power-conservation mode, receiving from an application running on the device an initial request to communicate data from the mobile device using the radio;
determining a period of time to wait to grant the initial request so that the mobile device is not immediately switched out of the power-conservation mode, wherein determining the period of time includes,
(1) setting a confidence level value such that a probability that a subsequent radio-usage request will be received prior to the granting of the initial request is greater than a given percentage;
(2) deriving a logarithmic result by evaluating a natural logarithm function that includes the confidence level as an input;
(3) determining a rate parameter by observing a duration of time between prior requests to use the radio; and
(4) dividing the logarithmic result by the rate parameter to calculate the period of time;
denying the initial request for the period of time; and
granting the initial request at the earlier of the expiration of the period of time or the expiration of a maximum period of time.

15. The media of claim 14, wherein the maximum period of time is a function of an amount of charge remaining in a battery of the device.

16. The media of claim 14, wherein deriving said logarithmic result includes evaluating the natural logarithm function of one minus said confidence level.

17. Computer-readable media having computer-useable instructions embodied thereon that, when executed, enable a mobile device that includes a radio to perform a method of conserving power, the method comprising:
determining that the mobile device is in a power-conservation mode;
receiving from an application running on the mobile device an initial request to communicate data from the mobile device using the radio while the mobile device is in the power-conservation mode;
determining a duration of time that granting the initial request is to be delayed so as to not bring the mobile device immediately out of the power-conservation mode, wherein determining the duration of time includes,
(1) determining a first period of time by evaluating a Poisson distribution function that includes a confidence level and a rate parameter as an input;
(2) determining a second period of time by evaluating a battery charge function that includes a remaining charge in a battery of the mobile device as an input;
(3) comparing the first period of time to the second period of time; and
(4) selecting the period of time having a lower value as the duration of time;
delaying a grant of the initial request until the duration of time elapses; and
granting the initial request at an expiration of the duration of time.

18. The media of claim 17, wherein determining the first period of time includes,
(1) providing an opportunity to set a value of a confidence level, which will indicate a probability that a subsequent radio-usage request will be received prior to the granting of the initial request;
(2) setting the confidence level to a value such that the probability is greater than a given percentage;
(3) deriving a result by evaluating a natural logarithm function that includes the confidence level as an input, thereby producing a logarithmic result;
(4) determining a rate parameter, which will indicate an expected number of radio-usage requests per second; wherein the rate parameter is a function of the duration of time between prior requests to use the radio; and
(5) dividing the logarithmic result by the rate parameter to calculate the first period of time.

19. The media of claim 17, wherein deriving the logarithmic result includes evaluating the natural logarithm function of one minus the confidence level.

20. The media of claim 17, further comprising setting a third period of time to a predetermined value;
comparing the first, second, and third period of time; and
selecting the period of time having a lowest value as the duration of time.

21. The media of claim 17, further comprising immediately granting the initial request upon receiving a user request to update the application even if the duration of time has not elapsed, wherein the user request is received via an input device coupled to the mobile device.

* * * * *